M. E. CARRIE, DEC'D.
F. G. CARRIE, ADMINISTRATOR.
GYROSCOPIC COMPASS.
APPLICATION FILED MAR. 24, 1903.

1,253,666.

Patented Jan. 15, 1918.
5 SHEETS—SHEET 1.

Witnesses:
Edward Rowland
M. F. Keating

Mervyn E. Carrie
Inventor
Franklin G. Carrie Admr.
By Attorney
Charles J. Kintner

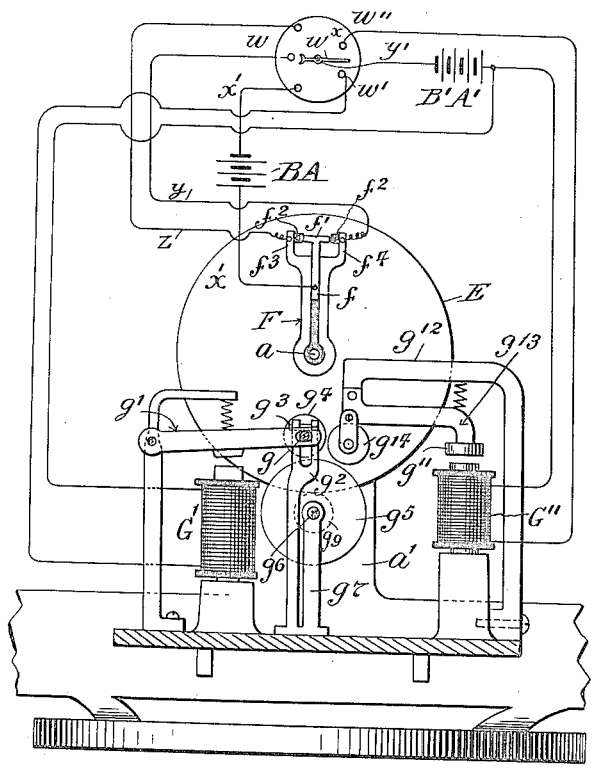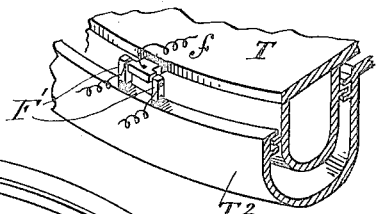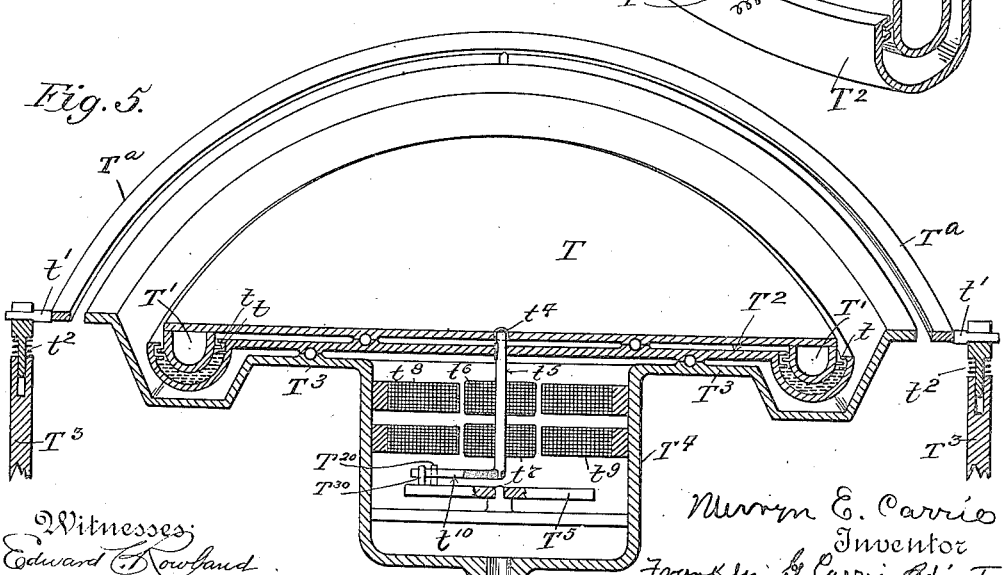

M. E. CARRIE, DEC'D.
F. G. CARRIE, ADMINISTRATOR.
GYROSCOPIC COMPASS.
APPLICATION FILED MAR. 24, 1903.
1,253,666. Patented Jan. 15, 1918.
5 SHEETS—SHEET 3.
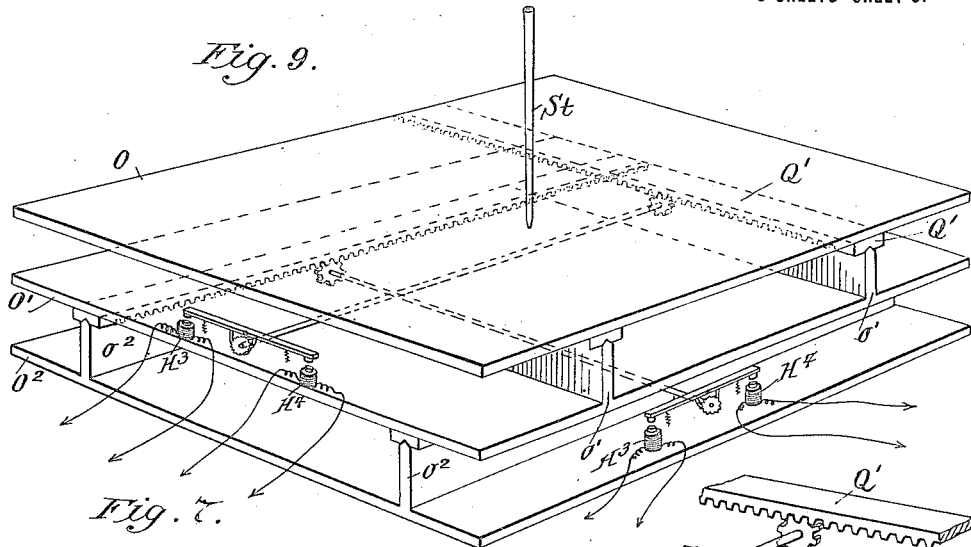
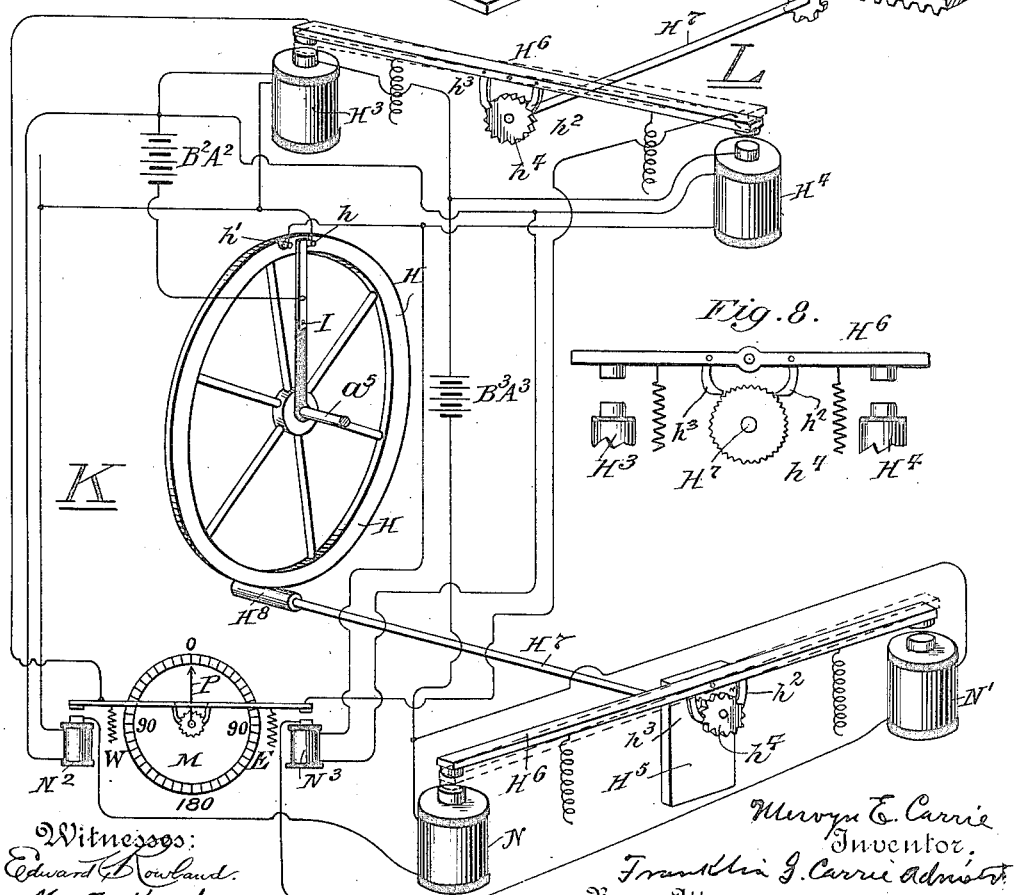

M. E. CARRIE, DEC'D.
F. G. CARRIE, ADMINISTRATOR.
GYROSCOPIC COMPASS.
APPLICATION FILED MAR. 24, 1903.

1,253,666.

Patented Jan. 15, 1918.
5 SHEETS—SHEET 4.

Witnesses:
Edward Howland
M. F. Keating

Mervyn E. Carrie
Inventor
Franklin G. Carrie Admr.
By Attorney
Charles J. Kintner M. E. CARRIE, DEC'D.
F. G. CARRIE, ADMINISTRATOR.
GYROSCOPIC COMPASS.
APPLICATION FILED MAR. 24, 1903.
1,253,666.
Patented Jan. 15, 1918.
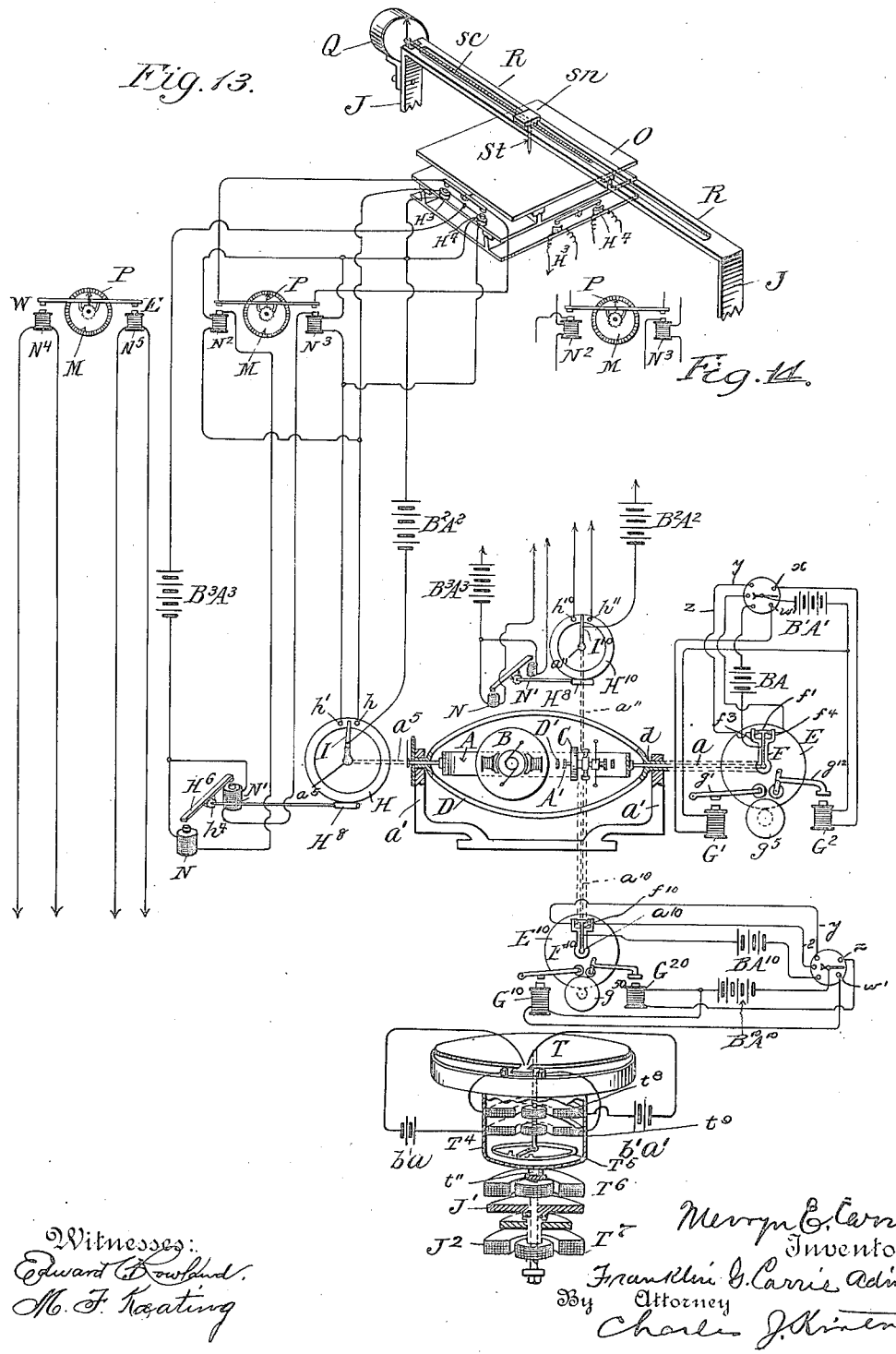

UNITED STATES PATENT OFFICE.

MERVYN EDWARD CARRIE, OF PHILADELPHIA, PENNSYLVANIA; FRANKLIN G. CARRIE, ADMINISTRATOR OF SAID MERVYN E. CARRIE, DECEASED, ASSIGNOR OF FIFTEEN ONE-HUNDREDTHS TO GEORGE A. ROSSITER, OF BROOKLYN, NEW YORK.

GYROSCOPIC COMPASS.

1,253,666.        Specification of Letters Patent.        Patented Jan. 15, 1918.

Application filed March 24, 1903. Serial No. 149,400.

*To all whom it may concern:*

Be it known that I, MERVYN E. CARRIE, a citizen of the United States, and resident of Philadelphia, county of Philadelphia, and State of Pennsylvania, have made a new and useful invention in Gyroscopic Compasses, of which the following is a specification.

This invention comprises a mechanism for automatically and continuously indicating latitude and longitude, as well as the position of either of the poles of the earth at any point on the surface thereof, and has for its object, first, to give constant and correct indications regardless of natural conditions; second, to render less necessary the usual nautical instruments; third, to provide a device for compensating for friction and lost motion, so that the movements recorded and indicated will be correct.

For a full and clear understanding of my invention, reference is had to the accompanying drawings, forming a part of this specification, in which—

Fig. 4 is a part diagrammatic, and part end view of that part of the controlling apparatus seen looking at Fig. 1 from right to left in the direction of the horizontal arrows;

Fig. 5 is a part perspective, part sectional view of the table and supporting attachments for the entire controlling apparatus, the upper ends of the sustaining or supporting standards to which the same is pivotally supported being shown in side elevation;

Fig. 6 is a detail perspective view, partly in section, of a part of the supporting table for the gyroscopes and the frames in which they are pivoted;

Fig. 7 is a part perspective, part diagrammatic view of a train of mechanism for operating the indicating and recording devices;

Fig. 8 is a detail diagrammatic view of a ratchet and pawl mechanism which may be utilized in the apparatus for effecting step by step movements;

Fig. 9 is a perspective view of the chart table upon which the latitude and longitude are indicated and recorded, the recording stylus also being shown above the center of the table;

Fig. 13 is a part perspective, part diagrammatic view illustrating diagrammatically so much of the complete system as will enable one to understand its operation as a whole; and Fig. 14 is a view illustrating a dial mechanism comprising a pair of magnets, a lever, a ratchet and a pair of pawls.

Figure 2:
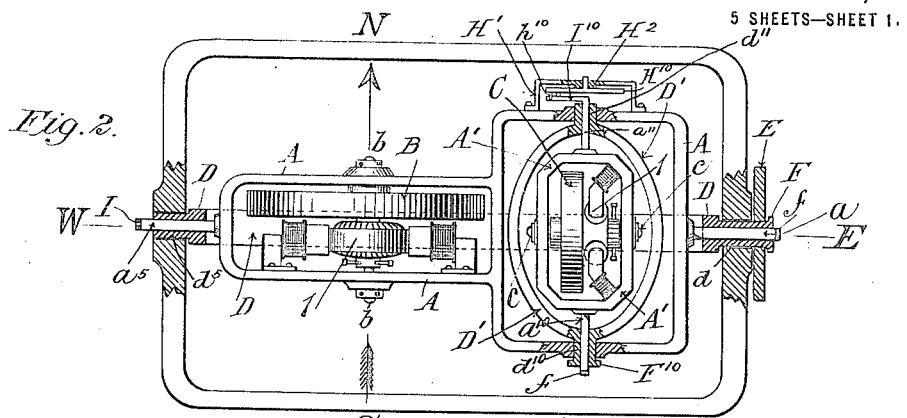
Fig. 2 is a part transverse sectional, part plan view of the same as seen looking at Fig. 1 in the direction of the vertical arrows on the right and left, with certain parts omitted.
Figure 1:
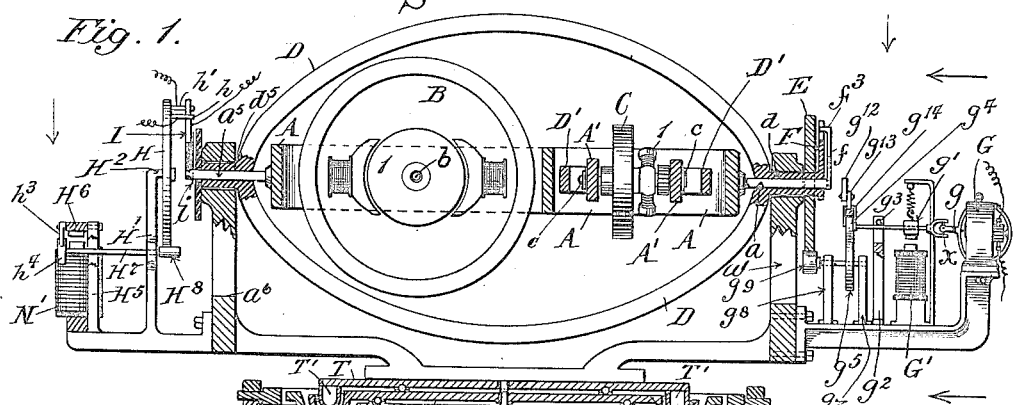
Figure 1 is a part longitudinal sectional, and part side elevational view illustrating the controlling appliances of the apparatus.

Referring now to the drawings, in detail, A, Figs. 1 and 2, represents a balanced frame or support in which two gyroscopes are mounted and adapted to rotate. The supporting frame is substantially rectangular in form, although its particular form is non-essential, and it is provided at each end with short shafts bearings or arbors $a$, $a^5$, on which it is adapted to turn or oscillate freely. These arbors $a$, $a^5$ are supported in proper journals or supports carried by the two vertical posts or standards $a^1$ $a^6$, which in turn are supported on a table T carried by a float, free to turn in azimuth, and held in a horizontal position by a pendulous system comprising the gyroscopic disks $J^1$ and $J^2$, all as will appear below.

In the frame A are mounted two gyroscope disks, B and C, one of them preferably larger than the other, B representing the larger or latitude wheel or gyroscope disk, and C the smaller or longitude wheel or disk. I have represented the disk B as mounted in the rear or left end of the said supporting frame A, and C as mounted in the front or right hand end of said frame A, but these positions may be reversed and the operation would be precisely the same. The disk B is mounted on the shaft or arbor $b$, $b$, so as to be rotated in a plane parallel with the length of the frame A, and the disk C at a right angle thereto, on a shaft or arbor $c$ $c$. These said shafts or arbors have their bearings in the supporting frames A and A' as shown.

Suitable motors $l$, $l$, are used for rotating the gyroscope disks B and C and they are revolved at a very high speed. Surrounding the supporting frame A is a second or latitude frame D which is substantially annular in form, and centrally thereof at each end said second frame is provided with stub shafts $d$ and $d^5$, which turn easily in journals in the posts or supports $a^1$, $a^6$. These shafts $d$, $d^5$, are bored through axially, as shown, so as to constitute journal bearings for the said additional short shafts $a^5$ and $a$, above mentioned. The shaft $d$ shown on the right in Fig. 1, constitutes a rigid support for a wheel E which coöperates with certain connections to be hereinafter described, their function being to compensate for friction and lost motion. To the extreme right hand end of this said stub shaft $d$, Fig. 1, is also secured a yoke or fork F which may, if preferred, be insulated from such shaft (see also Fig. 4). An arm or tongue $f$ is secured to the right hand or front shaft $a$ of the supporting frame A, so as to turn therewith and is insulated at its point of connection therewith, as will be clear from Figs. 1 and 4. At its outer end the tongue $f$ is provided with a cross arm $f^1$, extending substantially at right angles to its length. At the inside ends of the yoke or fork F are carbon buttons $f^2$, $f^2$ with which the cross arm $f^1$ is in loose electrical contact, so that the resistance of the said contacts is increased or diminished by pressure as the arm $f$ turns with the shaft $a$. From what has now been disclosed it will be clear that the pendulous weights comprising the gyroscopic disks $J^1$ and $J^2$, will keep the table T always horizontal and the standards or supports $a^1$ $a^6$ vertical. It will also be clear that if the second or latitude frame D be arranged in a vertical plane, it will likewise remain vertical with the standards $a^1$, $a^6$ until moved out of said plane, and that said standards and frame may be readily turned in azimuth so that the plane of rotation of the latitude disk B may be made parallel to the plane of the celestial equator. Accordingly, it is also evident that if the parts are positioned as just stated and the instrument is carried due north, owing to the tendency of the rotating gyroscopic disk B to maintain a plane parallel to that of the equator, the plane of the bearings or arbors $a$, $a^5$ and pivots $b$, $b$, as well as of the frame A will not turn the curvature of the earth, but will remain in a plane perpendicular to that of the equator. The plane of these parts will however turn with the curvature of the earth when the instrument is moved due east or west, as will appear below. On the other hand the standards $a^1$ $a^6$ will turn with the curvature of the earth as the latitude changes so as to always lie in the vertical plane of the place. It therefore follows that as the instrument proceeds due north or due south, a slight turning movement of the short shafts $d$ and $d^5$ about or over the bearings or arbors $a$ and $a^5$, will take place, and any friction that may be engendered in this turning movement will tend to rotate the said bearings or arbors $a$ and $a^5$ and therefore the disk B out of its plane parallel to the equator. Of course, it will be understood that the degree of movement of the fork F with the shaft $d$ is small, and therefore the movement of the arm $f$ with the cross piece or arm $f^1$ is very minute, relative to fork F, but it will be clear that the pressure of one end or the other of the arm $f^1$ against the carbons $f^2$ $f^2$ is due to the turning of the frame D while changing its latitude caused by the curvature of the earth; and the means by which the friction thus engendered is compensated for through the medium of the wheel E, between the stub shaft $d$, and the shaft or support $a$, is as follows:

A suitable motor G is located at a proper point and carries a shaft $g$ which is practically flexible by virtue of its being provided with a universal joint $x$. Two magnets G' G'' are located between the motor and the wheel E. An armature $g'$ is elastically supported on a suitable frame over the magnet G' and the shaft $g$ is passed through or attached to the armature $g'$ and extended toward the wheel E between the bifurcated or slotted support $g^2$ having a stop pin or lug $g^3$ to limit its upward movement. The rear end or part of the shaft $g$ nearest the wheel E has rigidly mounted on and adapted to rotate with it, a friction wheel $g^4$ which, under certain conditions, engages with a friction wheel $g^5$ mounted on a shaft $g^6$ which is supported in suitable standards $g^7$ $g^8$. On the end of the shaft $g^6$ is another friction wheel $g^9$ which is always engaged with the wheel E. The frame or bracket carrying the other armature $g''$ is preferably composed of two angular members $g^{12}$, $g^{13}$, properly supported and pivoted to each other at their front ends. A loop or yoke is also pivoted at or near the lower front corner of the frame or bracket and this loop carries a friction wheel $g^{14}$ which, under certain conditions to be hereinafter described, is also brought into contact with the wheel $g^5$ as well as with the wheel $g^4$.

In Fig. 4 of the drawings I have shown the connections to the wheel E and its fork as derived from the two electromagnets G' G'' and a suitable battery BA interposed at a proper point in the line, but I do not limit myself to any source of electrical or electromagnetic supply. A main and a branch line from a dynamo, for example, would produce the results desired and perhaps in most instances would be the means employed. To the two arms or prongs of the fork F adjacent to the carbon buttons are two wires $y$, $z$, the wire $y$ extending to one coil of a differential galvanometer $w$ and the wire $z$ to the other coil thereof. The dial of the galvanometer, as usual, is provided with a needle or pointer $w^x$ and also with two metallic stops $w'$ $w''$ for the needle as it is moved in one direction or the other by the current. The current on the wire $y$ passes from one prong of the fork F through the coil of the galvanometer to and through the battery BA back through the arm $f$ to one arm of the fork F, thus completing this circuit. The current on the wire $z$ passes from the other prong of the fork F through the other coil of the galvanometer $w$ to and through the same battery, through the arm or tongue $f$ to the fork F. As the pressure of the cross arm on the carbon buttons is variable, it will be apparent that the resistance and strength of the currents are also variable, and that the needle of the galvanometer will be deflected to one or the other of the stops $w'$ $w''$ as will be described later on. The galvanometer is not absolutely essential with the connections just described, as any properly operated circuit breaker may be substituted therefor, and in Fig. 12 I have shown a substitute apparatus for the same purpose which will be presently described. Referring again to Fig. 4, a second battery $B^1$ $A^1$ is suitably located and properly connected with the electromagnets G' G'' for energizing them. The wire $y'$ extends from the battery to the needle pivot and the current passes through the needle itself, to the stop $w'$. From stop $w'$ the current passes to the electromagnet G' and thence back to the battery, thus completing the circuit. A second current over wire $y'$ passes from the battery to the needle pivot through the needle when deflected to the left, or to the stop $w''$, and from this point to the electromagnet G'' and thence back to the battery when the pressure against the carbon is greater on the prong $f^4$ of the fork F than it is on the carbon carried by the other prong $f^3$.

In other words an increased pressure on the carbon $f^2$ of the south arm $f^3$ of the fork F causes an increasing flow of current which enters the arm or tongue $f$ from the battery BA, by the conductor $x'$ and passes out mainly through this arm $f$ to the galvanometer and deflects the needle to the stop $w'$ which permits the current flow that energizes the magnet G'. The armature $g'$ is thereupon drawn down and depresses the friction wheel $g^4$ driven by the motor G and brings it into operative driving connection with the periphery of the wheel $g^5$ thus reversing the movement of the wheel E, and compensating for any frictional rotary force that may have existed between the bearing $a$ and shaft $d$. This operation continues as long as the pressure is greater at the south arm $f^3$ of the fork F, or until the pressure is equalized, when the deflection of the needle ceases. If the pressure at the north arm $f^4$ of the fork F is the greater, then the current entering the arm or tongue $f$ from the battery BA passes out through said arm or tongue $f^4$ to the galvanometer, deflecting the needle to stop $w''$ and closing the circuit, thus carry current which energizes the magnet G''. The armature of this magnet is drawn into contact and the friction wheel $g^{14}$ is brought into operative mechanical or frictional connection with the wheels $g^4$ $g^5$. This mechanism accordingly operates to turn the wheel E in a reverse direction from that before described.

It will now be clear when the second frame D owing to the curvature of the earth is slightly moved from the plane of rotation of the disk B toward a vertical plane making an angle with said plane of rotation, and thereby generates more or less friction between the shaft $d$ and bearing $a$ that an increased pressure will be exerted on one or the other of the carbons $f^2$ $f^2$ and the wheel E will be turned in a direction opposite to that caused by the curvature of the earth, so that said friction will be compensated for. In other words, it will now be plain that I have provided a sort of frictionless support in the bearing $a$ and shaft $d$.

The frame D serves the purpose of transmitting the relative movements due to the earth's curvature to the opposite end of the gyroscope frame. But it will be understood that for this purpose half of this frame would be sufficient; that is to say, a frame of arch form, but as it is essential that it be counterbalanced for the delicate adjustment required I construct it preferably in the form of an annulus, as shown. The two end shafts or bearings $d$ and $d^5$ being rigidly connected move synchronously.

The longitude gyroscope and its coacting parts will now be described. The longitude disk C is mounted on the tilting frame A' having arbors or supports $a^{10}$ $a^{11}$, Fig. 2, and associated therewith is a third frame $D^1$ having hollow arbors or shafts $d^{10}$ $d^{11}$ through which the arbors $a^{10}$ $a^{11}$ respectively pass. Rigid with the arbor $a^{10}$ is an arm $f^{10}$ diagrammatically shown in Fig. 13 and in all respects the same as the arm $f$ associated with the bearing or arbor $a$, and rigid with the arbor $d^{10}$ is a wheel $E^{10}$, Fig. 3 in all respects the same as the wheel E associated with the stub shaft arbor $d$, while a forked arm indicated at $F^{10}$ is carried by arbor $d^{10}$ in all respects the same as arm F. In fact associated with the members just described are duplicates, not fully shown, of the members or devices above disclosed for compensating for friction between the bearing $a$ and shaft $d$; so that friction between the arbors or supports $a^{10}$ and $d^{10}$ is compensated for in connection with the disk C by means (not fully shown) which are or may be a duplicate of those employed in connection with the disk B. Or, in lieu thereof I may use an alternative form of mechanism which I design to use for both the latitude and longitude disks, if desired, as will be hereinafter described.

It is evident that when the instrument is carried due north or south in the plane of a meridian the plane of the frame A and axis $b\ b$ remains perpendicular to the plane of equator; while owing to the pendulous suspension comprising the disks $J^1$ and $J^2$ the plane of the posts $a^1$ and $a^6$ becomes inclined to said plane, to an extent depending upon the change in latitude. It is also evident that the latitude frame D would also become inclined to the plane of the equator if its slight rotations due to the curvature were not constantly corrected or destroyed by the friction compensating mechanism disclosed.

It will likewise now be clear that, if the vessel moves east or west, the parts are in the positions above supposed, and although the said north and south plane of the axis $b\ b$ remains fixed or perpendicular to the plane of the equator, as just stated, yet, the plane of frame A and of the arbors or supports $a\ a^5$ will be tipped in an east and west direction at an angle to the original plane of the meridian owing to the curvature of the earth, and that the extent of this tipping will depend upon the change in longitude. It should here be remarked that the only friction generated by the frame D which is not counteracted is that occurring between the journals carried by the posts $a^1$ and $a^6$ and the stub shafts $d$ and $d^5$ respectively; and that this latter friction does not tend to move the disk B out of its original plane.

Again, it will be clear that were it not for the friction compensating devices associated with stub shafts $d^{10}$ and $d^{11}$, the longitude or third frame $D^1$ would likewise change its initial inclination to the plane of the original meridian as the vessel changes its longitude. The frame $A^1$ however, being journaled as illustrated in the frame $D^1$ will not partake of this motion because the disk C will hold it in its original plane, perpendicular to that of the original meridian, and therefore the above relative movement between the arbors $a^{10}$ and $d^{10}$ will take place.

Again in the case of the latitude bearing or arbor $a^5$ it remains stationary while changes in latitude cause the stub shaft $d^5$ and its supports or journal $a^6$, to turn for changes in latitude, so that contacts such as $h$ and $h^1$ on a wheel H rigid with said supports will likewise turn or change their vertical planes as the latitude changes, and will contact with an arm I carried by the bearing or arbor $a^5$. In the same way, changes of longitude will cause similar contacts $h^{10}$ and $h^{11}$ (see Figs. 2 and 13) on a wheel $H^{10}$ to change their meridional planes and to have contact with an arm $I^{10}$ carried by shaft or arbor $a^{11}$. By the means just disclosed and their coöperating mechanism the latitude and longitude is or may be indicated and recorded, at a plurality of places aboard ship as will now be made plain.

The general idea of the utilization of like or duplicate parts of the controlling appliances which are designed to perform the several different functions, in connection with the complete apparatus, may be had from the diagrammatic view illustrated in Fig. 13 to which specific reference will be had later.

Referring now to the specific details of the controlling appliances for indicating and recording latitude H is the wheel for operating or controlling the recording and indicating mechanism, the letter $H^{10}$ representing like parts as applicable in connection with the longitude gyroscope disks C. This wheel H is mounted on a standard H' which supports a short shaft $H^2$ on which the wheel turns or rotates (see Figs. 1 and 7) and therefore the plane of the axis of this wheel will remain in a vertical plane. On the inner face of the periphery of the wheel H, or at any suitable point thereon, are two stops $h\ h'$ insulated from the wheel itself. An arm I is rigidly secured to the end of the bearing or arbor $a^5$ at the left of the gyroscope frame A and remains stationary with said frame. This arm I is insulated from the shaft $a$ and wheel H and is connected by a flexible conductor at its upper end to a battery $B^2\ A^2$, Fig. 13. When the movement of the wheel H owing to the curvature of the earth, during changes in latitude brings the arm I into contact with the stop $h$ it indicates a higher latitude, while its movement causing a contact with stop $h'$ indicates a lower latitude. These movements are indicated on proper dials, through the medium of mechanism which I will now proceed to describe. The two electromagnets N $N^1$ are mounted on the gyroscope table T in suitable proximity to the wheel H and about midway between the two magnets is a support H⁵, Fig. 1, to which is pivoted a duplex armature lever H⁶ having secured thereto at each side of the pivoted point of the armature a pawl $h^2$ $h^3$. A shaft H⁷ has bearings in the support H⁵ and on the end thereof is a ratchet wheel $h^4$ with which either of the pawls $h^2$ or $h^3$ is adapted to engage as one or the other of the armatures is brought into contact with one or the other of the electromagnets N, N¹. At the other end of the shaft H⁷ which is supported by the standard H¹ is a plain wheel or roll H⁸ which is in frictional engagement with the wheel H, as will be hereinafter explained. Similar mechanisms of substantially the same character as that just described are located at proper places in the pilot house, one to be used in connection with indicating dials, and the others for operating the chart table and other appliances to be hereinafter described.

K represents one of the mechanisms and M a dial with its needle or pointer P which is operated thereby. L represents another of these mechanisms which is provided with a rack and gear for operating the chart table (see Figs. 7, 9 and 13). This mechanism L, so far as the electromagnets, armatures, pawls and ratchets are concerned, is precisely the same as already described wherever used in the complete system. Instead, however, of having a smooth friction wheel at the end of the shaft H⁷, opposite the ratchet wheel, it is in this instance provided with a gear wheel which meshes with a toothed rack Q¹ for moving the chart table back and forth.

The means for operating these three mechanisms is as follows:—Starting from a point on the arm I (see Fig. 7) the current from the battery B² A² passes through the arm to the pin $h$ with which it is shown in very light contact on the drawings; thence in multiple by means of branch circuits to the left hand electromagnets H³ N² of both the dial and chart operating mechanisms, back to the battery B² A² and through the same to the arm I, thus operating the needle P of the dial and simultaneously moving the table by the movement of the rack bar, and indicating and registering the change of movement of the vessel to a higher latitude, primarily through the movement of the contacts $h$ and $h'$ on the wheel H produced by the curvature of the earth. It will be seen that in the operation just described the left hand ends of the armature in the mechanisms, L and K, are both in contact with the upper poles of the left hand magnets H³ N². A circuit is, therefore, closed from the battery B³ A³ by way of the pole of the magnet H³, armature H⁶, armature of the dial mechanism M, pole of magnet N², magnet N¹ back to the battery. This action, therefore, causes the armature H⁶ to be drawn into the position shown in dotted lines, thereby imparting motion to the shaft H⁷ and roller H⁸, and, consequently, to the wheel H, rotating the arm I to the left and breaking or varying the circuit between arm I and contact $h$ so as to operate the indicating mechanism and release the armature H⁶. Regarding the up and down movements of the pawls $h^3$ and $h^2$, it will be observed that these pawls are secured at equal distances from the center of the armature H⁶, and that as pawl $h^3$, for example, descends a distance a little more than equal to the space of two teeth the pawl $h^2$ not only simultaneously ascends the same distance and therefore does not prevent the wheel $h^4$ from rotating but it moves out of the path of its associated ascending tooth, so that the latter readily slips past said pawl $h^2$. Of course, any other suitable device may be substituted for these parts. For indicating and recording the change to a lower latitude, when the arm I is in contact with the pin $h'$ on wheel H, the same character of circuits are used, excepting that the currents are passed through the right hand magnets H⁴ N³ instead of the left hand magnets H³ N², thus reversing the direction of the needle on the dial and the movement of the chart table, and further description thereof will therefore be unnecessary.

The mechanism now disclosed will make it plain that changes of latitude are readily indicated at a plurality of places on ship board, by the to and fro movements of the contacts $h$ and $h^1$ corresponding to changes in latitude, relative to the arm I carried by the latitude arbor $a^5$, and by the rotary movements imparted to shafts such as H⁷ and pointers such as P as well as by reciprocating movements imparted to racks such as Q¹, all as a result of circuits closed by said arm I and contacts $h$ and $h^1$. It will also be evident that duplicate mechanisms or devices are provided in connection with the longitude arbor $a^{11}$, arm I¹⁰, wheel H¹⁰ and contacts $h^{10}$ and $h^{11}$, the latter being shown in Fig. 13.

These latitude and longitude indicating devices when in the form of racks Q¹ are readily assembled at right angles to each other as indicated in Figs. 9 and 13, to operate a chart table. This table is generally mounted in the pilot house and is preferably rectangular in form, although the particular configuration is not essential. It comprises three parts or members O, O', O² slidably mounted one above the other. The lower member O² is relatively fixed and near its ends are vertical supports $o^2$ $o^2$ which receive the member O' at some distance above the base or member O². The under side of the member O' has grooved cleats and the supports $o^2$ are tongued and fit in the grooves in said cleats, so that the part O' may slide freely in two directions; that is to say, back and forth on these supports. The top of the part O' also has vertical tongued supports o" similar to the supports $o^2$, but they are arranged at right angles thereto. The top member or part O has corresponding grooves for the tongues $o'$ and the arrangement is such that the top member O also has a back and forth movement, but at right angles to the member O'. Between the tables O, O' and also between tables O' and $O^2$ are mounted the various mechanisms already described and represented in Fig. 7 for operating the table and for indicating the latitude and longitude respectively, and these are as a matter of course arranged at right angles to each other. A suitable pointer, stylus, siphon recorder, or analogous device $S^t$ is mounted as shown, above the table and records or traces all the changes of the movement of the vessel thereon. In practice a sheet of paper, linen, a coat of carbon or graphite, or any chart is used on the table for such tracings. In view of the fact that the longitude gyroscope rotates in a plane of a meridian and would have its plane of rotation turned through 360° in one day or 15° per hour, owing to the earth's rotation, I have provided a 24 hour clock mechanism Q (see Fig. 13) sustained by one of two standards J which support at their upper ends the frame work R that sustains the stylus $S^t$. The hour shaft of this clock is connected directly to a screw $sc$ which passes through a screw-nut $sn$ connected directly to the stylus, the arrangement being such that the clock mechanism keeping accurate time necessarily gives a correct indication of the time when the sun crosses the meridian above and below. The hour shaft of the clock mechanism and screw attached thereto rotates in the proper direction to cause the stylus $S^t$ to move in a reverse direction to the movement successively imparted by the longitude mechanism L to the chart table O. In other words, if the vessel is in port it is obvious that inasmuch as the longitude mechanism is always successively moving the chart table O from west to east, the clock mechanism will be simultaneously moving the stylus $S^t$ in such a direction that so long as the vessel remains in port or is absolutely stationary no registration of longitude will be effected on the chart table.

Fig. 5 of the drawings shows the table for supporting the gyroscopes and their frames as well as the friction compensating mechanism and the wheel and arm through the medium of which the indicating and registering mechanism is operated or controlled. The view is a central vertical section. The table proper which supports the apparatus is marked T and is preferably circular. Extending around its periphery on the underside is a hollow float T' which, with the table, is supported in an annular trough filled with mercury, which trough is attached to or forms a part of a second or supporting base $T^2$ beneath the table T. This trough conforms substantially to the configuration of the underside of the base $T^2$, which base is supported by a frame $T^3$.

As will best be seen from Fig. 6, the table T is provided with an insulated contact member $f$ adapted to make contact with a pair of insulated contact F' carried by the supporting base $T^2$. The currents controlled by the contacts $f$ F' serve to operate the motor driving the shaft 5, as will appear below.

This frame $T^3$ is pivoted at two points to a ring or annulus $T^a$, which ring is resiliently and delicately mounted on the two vertical supports $T^b$, $T^b$ by means of knife edge bearings $t'$ $t'$, Fig. 5 and the spiral springs $t^2$. The table T and base $T^2$ are pivoted to each other by means of the short pivot $t^4$ which is secured to the base $T^2$ and moves freely in a bearing in the center of the table T. Suitable ball bearings are used between the table and base and also between the base and the trough shaped frame $T^3$ for the purpose of overcoming friction and making the adjustment very sensitive, as clearly shown. The base $T^2$ has on its underside a centrally arranged shaft $t^5$ on which are wound two rotary armatures $t^6$ $t^7$ within magnetic fields $t^8$ $t^9$ of two rotary motors for the purpose of turning the shaft $t^5$ in opposite directions from time to time. These field coils are supported by a suitable tubular extension $T^4$ attached to or forming a part of the trough carrying frame $T^3$. On the bottom of the shaft $t^5$ is attached an arm $t^{10}$ substantially the same as the arm I above described in connection with the wheel E, and the latter has its counterpart in a wheel $T^5$ carrying the contacts $T^{20}$ and $T^{30}$. The wheel $T^5$ is mounted to be turned on a suitable pivot or stub shaft in the bottom of the tubular extension $T^4$. It will be seen that this arm and wheel are similar to the wheel H contacts $h$ and $h^1$ and arm I (Figs. 1, 7 and 13) excepting that they are arranged horizontally instead of vertically. The arm and wheel just described and the means for operating the same, being substantially like the corresponding mechanism indicated by the letters K and L, Fig. 7, show by means of a proper dial and pointer, such as M and P located in the pilot house changes in position, in the same manner that the wheel E, arm I and connected mechanism indicate latitude and longitude, thus simulating a compass in its operation. For example, the turning of the table T upon which the gyroscopes and appendages rest, in either direction in a horizontal plane, may be detected and electrically and mechanically transmitted to the dial M shown on the extreme left hand side of Fig. 13 and situated in the pilot house or elsewhere, precisely as the deflections of the latitude gyroscopes are detected transmitted and indicated by the arms I, stops $h$ $h^1$, wheels H, conducting wires, ratchet and dial mechanism M, Fig. 7. It will be remembered in this connection that the axis of the latitude gyroscope B when properly set and in operation is always parallel to the axis of the earth, and that the gyroscope disk B itself, when in operation, always rotates in a plane parallel with a plane passing through the equator, so that if the vessel is traveling east or west on the equator this gyroscope B will be rotating exactly in said plane.

From the bottom or underside of the tubular extension $T^4$ depends another shaft $t^{11}$ and on this shaft are two heavy gyroscopic disks $J^1$ $J^2$ arranged in a horizontal position and adapted to be turned in opposite directions by suitable electric motors $T^6$ $T^7$ operatively connected with the independent batteries $b$ $a$ and $b^1$ $a^1$ (see Figs. 1 and 13). These disks are for the purpose of yieldingly maintaining the table always in a horizontal plane. It is pertinent to remark that a gyroscope retains its plane of rotation, only when freely suspended and free from outwardly impressed mechanism disturbances which, of course, implies that the lines passing through its points of suspension shall also pass through its center of gravity. These conditions are true of the latitude and longitude gyroscopic disks B and C but are not true of the gyroscopes suspended beneath the table, and well below the center of gravity of the table and the apparatus upon it. Inasmuch as these lower gyroscopes $J^1$ $J^2$ have weight they act as any other dead weight would act in preserving the horizontality of the table. In addition to this they resist swaying disturbances to the table caused by sudden shocks from the rolling or pitching of the vessel, the vibrations of the engine, etc., as dead weight would not do; for a gyroscope will violently resist any sudden effort to change its place of rotation while it yields perfectly to any gradually impressed force. It is this last mentioned property of yielding to gradually impressed force (in this case gravity) that allows the disks $J^1$, and $J^2$ to hang vertically and in no way interfere with the change of plane of the table T owing to the curvature of the earth, and to changes in latitude and longitude.

In Fig. 8 of the drawings I have shown the ratchet and pawl mechanism by which the step by step control is effected. The ratchet and pawl mechanism illustrated in Fig. 7 is shown on an exaggerated scale and diagrammatically so as to give a better illustration of the circuit relations of the parts. As illustrated in said Fig. 8, when either of the pawls is depressed, under the influence of its corresponding magnet, it will rotate the ratchet wheel $h^4$ through a distance of two teeth so that when the armature $H^6$ is released by that magnet the two pawls by their own weight will assume the position shown. Therefore, no matter which pawl be operated upon the shaft $H^7$ will be rotated in the proper direction.

Figure 10:
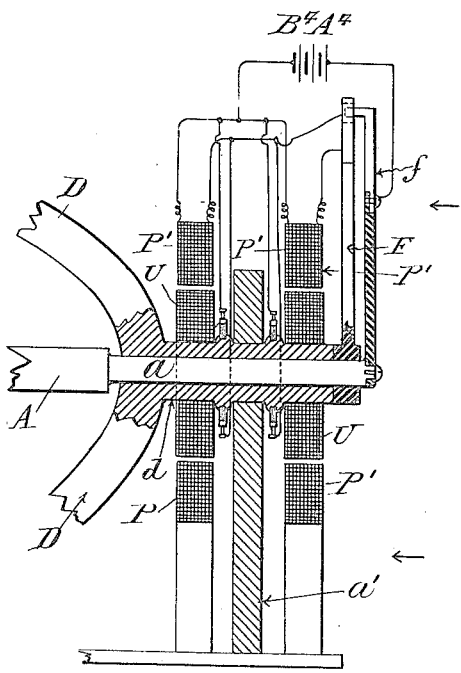
Fig. 10 is a vertical sectional view illustrating the modified form of electro-motive controlling apparatus for adjusting the gyroscope frames and effecting certain movements of other parts of the apparatus.
Figure 11:
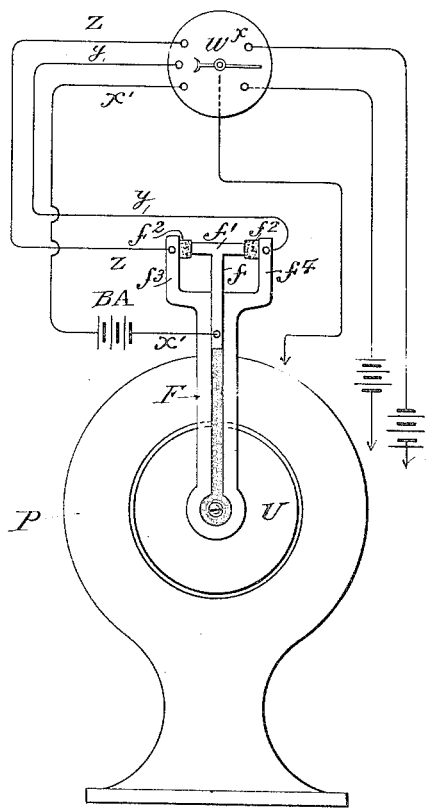
Fig. 11 is a part diagrammatic, part end elevational view of a mechanism such as that disclosed in Fig. 10, and upon the supposition that a single motor is used and the armature thereof made reversible in its rotation.
Figure 12:
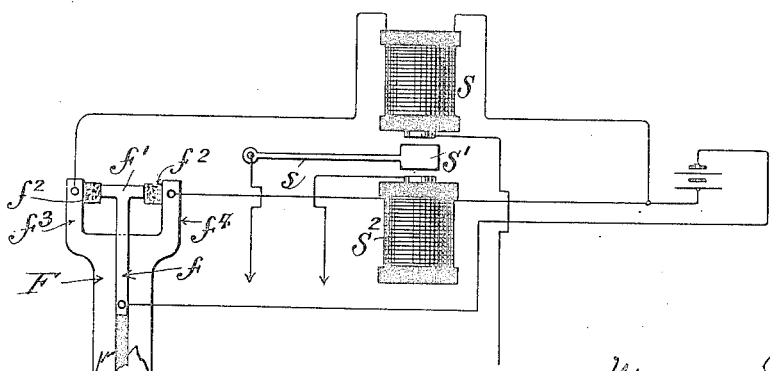
Fig. 12 is a diagrammatic view of a modified form of circuit breaker for the compensating mechanism shown in Fig. 4.

Figs. 10, 11 and 12 show modified forms of mechanism which may be used in lieu of the mechanism described in detail for overcoming the friction and lost motion.

Figure 3:
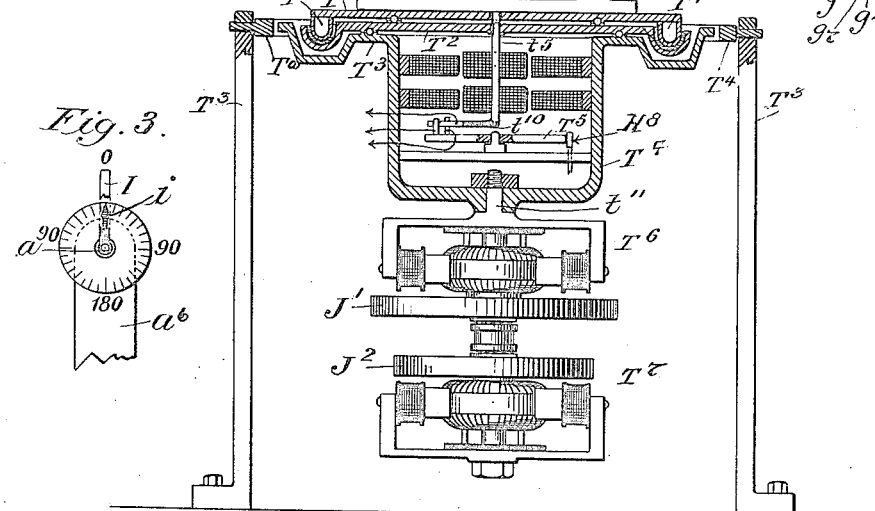
Fig. 3 is a detail view of a dial and pointer for adjusting the gyroscope frame.

In Figs. 10 and 11 I have illustrated a modified form of mechanism for taking the place of the mechanism for compensating for friction disclosed in Figs. 1, 3 and 13, and whereby the movement of the wheel E in opposite directions is effected. In these Figs. 10 and 11 of the drawings two electric motors are shown embracing stationary field magnets $P^1$ $P^1$ secured to the frame and rotary armatures U, U, the latter sustained by the shaft or bearing $d$ of the frame D. To the outer end of this shaft $d$ is connected and insulated therefrom a fork F and to the shaft or arbor $a$ and arm $f$, also insulated from the shaft.

The circuit, however, is differently arranged but has a similar function and mode of operation. The circuit starts from a battery $B^4$ $A^4$ suitably located and branches to each of the field magnets $P^1$, $P^1$ of the motors U, U and passes through the same, extending to the ends of the fork of arm F adjacent to the carbon buttons. From one or the other of these buttons, or both, it passes to the cross arm carried by arm $f$ and thence back to the battery. The motors being excited tend to turn the sleeve in opposite directions, with forces corresponding to the pressures on the carbon buttons. This mechanism may be used in the same manner as that described in that part of the specification which refers to the equivalent mechanism shown in Fig. 1. This mechanism may also be used for the longitude disk, it being obvious to those skilled in the art that the circuit arrangement illustrated in the apparatus represented by the letters K and L, Fig. 2 may be so arranged as to adapt the same for the use of such motors in place of the step by step mechanism illustrated. Two motors are shown in Fig. 10 of the drawings, but if a motor should be used at each end of the frame D it would be single instead of double.

In Fig. 11 I have shown the same structure as that shown in Fig. 10, but with a single motor used in connection with a galvanometer or suitable circuit breaker, so that by the use of a single motor the direction of the current flow, and hence the movement of the arm $f$, may be reversed. The circuits are arranged in a well known manner on the drawing to produce this result, and need no explanation.

Fig. 12 represents a mechanism which may be used in place of the galvanometer shown and described. It comprises means for making and breaking a circuit and it is represented in this view as connected with fork F and arm $f$. It consists of two electromagnets S, $S^2$ arranged in such relation that their poles are opposite each other with an armature $S^1$ between them. This armature is carried or supported by a spring arm $s$ and may thus be brought into contact with one or the other of the magnets as they are energized. The circuit is formed in the same manner as in the case where the galvanometer is used and the description thereof need not be repeated.

The operation of the mechanism will be clear from the foregoing, but may be summarized as follows: Having been suitably arranged on board ship, the gyroscope table T is adjusted so that the axis $b\ b$ of disk B will point due north and south (see Fig. 2). The plane of the gyroscope B is by means of the dial and needle, Fig. 3, inclined into a plane parallel with the plane of the equator and at an angle to the vertical plane equal to the latitude of the place of starting. The latitude and longitude dials are adjusted to the latitude and longitude of the starting point and the chart table is so adjusted as to bring the pointer, stylus, or siphon recorder $S^t$ to that point upon the chart or map—correctly placed upon the table—which represents the latitude and longitude of the starting point. All the electric motors which control the movements of the apparatus are then set in motion, those motors which continuously drive the gyroscopes being given a very high velocity.

The latitude gyroscopic disk B by its varying inclination to the vertical, due to the earth's curvature, as the vessel proceeds on her course, will transmit to the latitude dial and chart table the changes in latitude, through the indicating and recording mechanism. In like manner the total rotation of the longitude gyroscopic disk C, comprising that portion due to the earth's rotation and that due to motion of translation along with the ship east or west of the meridian of the starting point, is transmitted to the longitude dial and chart table, while the clock mechanism Q, Fig. 13 corrects that portion of the readings due to the earth's rotation, and thus is indicated and recorded the changes in longitude. The composition of the two movements, due to changes in latitude and longitude, respectively, gives in the curves traced by the pencil, stylus, or siphon recorder the precise course of the ship. The original north and south direction given to the latitude gyroscope B is preserved, owing to the tendency of the rotating disks to preserve their planes of rotation assisted by the mechanism for compensating for friction and lost motion in a horizontal plane. It will, of course, be understood that the gyroscope frame with its gyroscopes and attachments is mounted on the freely movable table T supported by the mercury, and which table is located at any suitable place on the vessel, preferably at some point amidships. It will also be apparent that the chart table and the latitude and longitude dials are preferably located in the pilot house.

In view of the description heretofore given, a critical examination of Fig. 13 will disclose the fact that so long as all of the gyroscopes are continuously rotating and the 24 hour clocks correctly adjusted and set for the longitude from which the vessel is sailing, the mechanism will continue to indicate on the latitude and longitude dials the latitude and longitude in degrees and record on the chart table the actual latitude and longitude. At the same time, as the vessel proceeds, any change of direction will cause the polar indicator M, shown on the extreme left hand side of Fig. 13 of the drawings, to give a correct indication of the number of degrees of such change, either east or west of the north point, or east or west of the south point, it being apparent that the exact polar indication on a controlling apparatus amid-ship will be given by the arrow NS (see Fig. 2) on the base of the instrument, as obviously, if the controlling gyroscopes B and C be kept moving this indication will never change. It will, also be apparent that the gyroscopes $J^1$ and $J^2$ and controlling apparatus located below their pivot pins of support on the standard, $T^b\ T^b$ being of sufficient weight with the other apparatus to effectually balance the controlling apparatus above, will maintain the delicately pivoted supported means of control always in the position of starting.

From the foregoing it will be apparent that the arrow N S, the axis $bb$ or any other part of the mechanism may be properly oriented when the motor is started and thus constitute a means for indicating the true north or any other point of the compass. In the same way, the pivot $T^4$ or any other part of the frame may be pointed to the head of the ship and thus constitute a lubbers point by which the course is determined. It will also be clear that the mechanism disclosed provides a gyroscopic disk such as B associated with bearings, in this instance, exemplified by the arbors $a$ and $a^5$, which bearings are in turn associated with the journals or standards $a^1$ and $a^6$; that said standards are supported on the horizontal table T and that said table is supported on the ball bearings and mercury float illustrated, which in turn are supported on the gimbal mountings and standards $T^8$ resting on the deck of the ship. In other words, the parts $a$, $a^5$, $a^1$, $a^6$, T, T', constitute in this instance a support for the disk B which comprises friction surfaces between said parts $a^d$ and $a^1$ for example, and also friction surfaces between the horizontal table T and its associated ball bearings.

It will also be apparent that as friction is generated at any bearing such as $a$ for example, it will be automatically compensated for as the disks B and C move over the earth's surface by the mechanism comprising the arm F and its associated parts.

It will further be clear that the above mechanism provides contacts $f$, F' associated with the table T controlling circuits to an automatic friction compensating mechanism similar to that just mentioned, and which last named mechanism compensates for any errors of the compass due to friction engendered when the ship turns in azimuth. Said mechanism further provides a vertical shaft $t^5$ having an arm $t^{10}$ adapted to make circuit with the contacts $T^{20}$ and $T^{30}$, which circuit controls indicating mechanism similar to that constituted by the parts H, H' $H^7$, $H^6$, $h^3$, $h^4$, etc. It will likewise be clear that the gyroscopic pendulum will act differently from a pendulum consisting of dead weight only, in that it will not readily respond to the rolling and pitching movements of the ship as would a dead weight pendulum, but will resist sudden motions of this kind, and therefore, while compelling the table T to assume a horizontal position as the ship moves over the earth's surface, yet it will stabilize or tend to maintain substantially horizontal the table T, or other horizontally disposed member, even though the ship pitches violently.

In other words, the parts A, $a^1$, $a^6$, T, $T^3$, $T^4$, $T^5$, etc., in the instance illustrated constitute a pendulum supporting means for the gyroscopic disk B that is adapted by its dead weight to assume a normal fixed position relative to the horizontal plane as the ship moves over the earth's surface, while the gyroscopic disks such as $J^1$, $J^2$ associated with said supporting means constitutes in this instance, an example of a stabilizing gyroscopic device, of general application, adapted to prevent errors of gyroscopic compasses due to the rolling and pitching movements of the ship. Stated in still other language, in the instance disclosed, as the ship moves over the earth's surface the dead weight of the parts mentioned will cause the table T or other horizontally disposed member, to automatically assume a horizontal plane and the standards $a^1$ $a^6$ to automatically assume a vertical plane as each new position is reached, while the gyroscopic disks such as $J^1$ $J^2$ will stabilize said parts in their respective planes as the ship rolls and pitches.

The invention may be used with facility in making surveys of coast lines, as well as for other purpose where the exact latitude or longitude is required, and while the mechanism above described is the best form known to me, minor changes may be made within the scope of my invention without departing from the spirit thereof or sacrificing any of the advantages thereof.

Therefore I do not limit my invention to the details of construction shown in the drawings and hereinbefore described for determining the position of a moving vessel or body upon the earth's surface, through the agency of gyroscopes kept in continuous rotation, and for thereby effecting a coördinate indication or coördinate registration of such point or location, as my claims hereinafter are to be construed as of the most generic nature with relation to the utilization of gyroscopes rotating in planes at angles to each other and combined generically with means for effecting such coördinary indication registration or both.

Having thus fully defined the invention, what I claim as new and desire to secure by Letters Patent, is:

1. In a gyroscopic compass for use on a moving vessel, the combination of a gyroscopic disk; means associated with said disk for indicating the true north; means associated with said disk for transmitting its indications to a distant point; and gyroscopic means associated with said disk tending to prevent compass errors due to the rolling and pitching movements of the vessel, substantially as described.

2. In a gyroscopic compass for use on a moving vessel the combination of a gyroscopic disk; means associated with said disk for indicating the true north; means associated with said disk for transmitting its indications to a distant point; supporting means associated with said disk adapted to generate friction as the ship moves in azimuth; automatic means for compensating for compass errors due to the friction generated by said supporting means; and pendulous gyroscopic means associated with said disk tending to prevent compass errors due to the rolling and pitching movements of the vessel, substantially as described.

In testimony whereof I affix my signature in presence of two witnesses.

MERVYN EDWARD CARRIE.

Witnesses:
CHAS. G. ANDERSON,
GEORGE A. ROSSITER.